(12) United States Patent
Henderson

(10) Patent No.: US 10,024,479 B2
(45) Date of Patent: Jul. 17, 2018

(54) SYSTEM AND METHOD FOR PROVIDING UPKEEP AND MAINTENANCE TO PIPING SYSTEMS

(71) Applicant: James M Henderson, Escondido, CA (US)

(72) Inventor: James M Henderson, Escondido, CA (US)

(*) Notice: Subject to any disclaimer, the term of this patent is extended or adjusted under 35 U.S.C. 154(b) by 553 days.

(21) Appl. No.: 13/840,973

(22) Filed: Mar. 15, 2013

(65) Prior Publication Data

US 2014/0116080 A1    May 1, 2014

Related U.S. Application Data

(60) Provisional application No. 61/611,209, filed on Mar. 15, 2012.

(51) Int. Cl.

| | |
|---|---|
| *F25D 3/00* | (2006.01) |
| *F25C 1/00* | (2006.01) |
| *A62C 31/02* | (2006.01) |
| *B05B 1/28* | (2006.01) |
| *G01F 1/42* | (2006.01) |
| *G05D 7/01* | (2006.01) |
| *B25B 23/16* | (2006.01) |
| *F16L 55/103* | (2006.01) |
| *F25C 1/12* | (2006.01) |
| *F25D 3/10* | (2006.01) |

(52) U.S. Cl.
CPC ............... *F16L 55/103* (2013.01); *F25C 1/12* (2013.01); *F25D 3/107* (2013.01)

(58) Field of Classification Search
CPC ............ F25D 3/107; F25C 1/12; F16L 55/103
USPC .......... 62/66, 293, 398; 81/DIG. 8; 239/589, 239/301; 138/44, 46
See application file for complete search history.

(56) References Cited

U.S. PATENT DOCUMENTS 3,936,082 A * 2/1976 Swanson ................. E05C 19/14
                                               292/106
4,267,699 A * 5/1981 Bahrenburg ..................... 62/66
4,433,556 A * 2/1984 Brady .............................. 62/293
(Continued)

FOREIGN PATENT DOCUMENTS

EP         1273845 A1 *  1/2003    ............ F16L 55/103

OTHER PUBLICATIONS

Translation of European Patent Document EP 1273845 A1 named Translation-EP 1273845 A1, translated Dec. 2015.*

*Primary Examiner* — Justin Jonaitis
*Assistant Examiner* — Paul Alvare
(74) *Attorney, Agent, or Firm* — Timothy W. Fitzwilliam

(57) ABSTRACT

A system for providing upkeep and maintenance to piping including in improved pipe freezing apparatus. In a specific embodiment, the system is quite useful to replace worn valves that may require digging underground to expose enough of the pipe system. Novel tools for removing the valve are additionally provided by the present invention. The preferred embodiment further improves upon job safety when using $CO_2$ (dry ice) evaporating and venting the chamber as a gas displacing oxygen. The novel design of the pipe freezing apparatus described herein can be installed by hand without tools. Said design further obviates a need for a specifically designed vent for the pipe freezing apparatus.

9 Claims, 12 Drawing Sheets

(56) References Cited

U.S. PATENT DOCUMENTS

| | | | | |
|---|---|---|---|---|
| 4,452,277 | A | * | 6/1984 | Wells ................. F16L 37/58 |
| | | | | 138/40 |
| 4,487,643 | A | * | 12/1984 | Ellett ............................ 156/80 |
| 4,890,869 | A | * | 1/1990 | Langkamp, Jr. ............. 292/113 |
| 5,680,770 | A | * | 10/1997 | Hall et al. ..................... 62/293 |
| 5,820,102 | A | * | 10/1998 | Borland ...................... 251/144 |
| 5,960,684 | A | * | 10/1999 | Bosley .................... B25B 17/00 |
| | | | | 81/177.1 |
| 5,987,906 | A | | 11/1999 | Hallet |
| 7,000,897 | B2 | * | 2/2006 | Chick .......................... 251/293 |
| 8,240,167 | B2 | | 8/2012 | Ingram |
| 2002/0197396 | A1 | * | 12/2002 | Haggquist .................... 427/180 |
| 2006/0207393 | A1 | * | 9/2006 | Stupar ....................... 81/177.75 |
| 2007/0046020 | A1 | * | 3/2007 | Brass et al. ..................... 285/98 |
| 2011/0192184 | A1 | * | 8/2011 | Yamashita et al. .......... 62/196.1 |
| 2012/0018531 | A1 | * | 1/2012 | Fenton et al. .................. 239/11 |

\* cited by examiner

SYSTEM AND METHOD FOR PROVIDING UPKEEP AND MAINTENANCE TO PIPING SYSTEMS

PRIORITY CLAIM

This utility patent application contains subject matter claiming benefit of the priority date of U.S. Provisional Patent Application Ser. No. 61/611,209, filed on Mar. 15, 2012, entitled "Angle Meter Stop Valve Removal System and Method;" accordingly, the entire contents of this provisional patent application is hereby expressly incorporated by reference.

BACKGROUND OF THE INVENTION

Field of the Invention

The present invention pertains generally to devices and methods for maintaining pipe systems wherein a section of pipe is frozen so that components may be swapped out or another section of pipe could be repaired. More particularly, the invention relates to an improved pipe freezing apparatus, and further novel methods and devices useful for replacing an angle meter stop valve.

Description of the Prior Art

Pipe freezing apparatuses, for creating a dry section of pipe to be worked on downstream relative thereto, have been known for some time. A somewhat early example was proposed by Hallett, U.S. Pat. No. 5,987,906, entitled "Pipe Freezing Apparatus," and was awarded patent protection in 1999. Another example was developed by Ingram, U.S. Pat. No. 8,240,167 entitled "Cyrogenic Freezing Apparatus."

As told by both Ingram and Hallett, historically, repairing or replacing sections of fluid carrying pipe required draining of the pipe, and then cutting and/or replacing the pipe section (or valve section). This time consuming and expensive procedure has been largely replaced through the use of pipe freezing devices that freeze a plug of liquid inside the pipe upstream of the pipe section that is to be repaired or replaced. The frozen plug prevents liquid from flowing from the pipe during repair. After the repairs have been made, the plug is allowed to thaw so that liquid can again flow through the pipe.

Pipe freezing devices are further typically comprised of a refrigerant chamber that is placed around or against the pipe section to be frozen. In one type of device, the chamber includes a concave wall section having a radius that corresponds to the radius of the pipe. When used, the chamber, which is of a thermally conductive material such as aluminum, is placed against the pipe.

European Patent Application, EP-A-0145114, entitled "Pipe Freezing Device," and filed in 1984, describes a pipe freezing apparatus which is particularly suited to freezing water in pipes, enabling same to be cut without draining the system. In this particular patent disclosure, a freezer head is attached to the pipe on each side of the region to be worked on, and plugs of frozen water are formed in the pipe, at the location of the freezer heads. The freezer heads constitute expansion chambers, liquid refrigerant being pumped (or drawn) into the chamber walls. The arrangement is well known.

In another type of freezing device, commonly referred to as a pipe enclosure device, the chamber is comprised of two sections that are clamped together around the pipe. The resultant chamber has openings in each end with a cross-section corresponding to the cross-section of the pipe. The present invention relates generally to a pipe freezing apparatus of the type.

The freezing device also includes an inlet that can be connected to a source of a low-temperature liquid refrigerant, e.g. pressurized liquid $CO_2$ or nitrogen. The chamber also includes one or more exhaust ports, to which may be coupled a vent stack, normally on the opposite side of the chamber from the refrigerant inlet.

In use, the chamber is clamped around the pipe section with the pipe extending through the openings in the chamber. Refrigerant is then introduced, normally via a hose from a refrigerant source, into the chamber and allowed to evaporate, with the evaporated refrigerant escaping through one or more of the exhaust ports. As the refrigerant solidifies into dry ice and subsequently evaporates, heat is extracted from the pipe and fluid within the section of pipe enclosed by the chamber, resulting in freezing of the liquid within the section of pipe enclosed by the chamber.

Regarding a more specific application, it is routinely common for the angle meter stop valve in a water service line to a water meter at a residence or business establishment to need replacement due to corrosion or normal wear and tear. Because the angle meter stop valve is positioned below ground level, the removal of the old angle meter stop valve is conventionally performed by digging a large hole around the angle meter stop valve so that the wrenches can be attached to the angle meter stop valve fittings and appropriately rotated. Prior to removing the angle meter stop valve, the water supply pipe leading to the angle meter stop valve is blocked by freezing the water in a region of the pipe below the angle meter stop valve. Conventionally, this is a time consuming process requiring the removal of a large amount of soil or even concrete to provide the necessary access for tools and personnel; however, the present invention seeks to provide novel tools and method making this procedure less costly and more safe to the field operator.

In a first aspect, the present invention seeks to offer improvements to a chamber-type pipe freezing apparatus. More specifically, said improvements herein are particularly useful when the pipe section to be maintained is subterranean so that a hole must be dug. Still further, the invention improves upon job safety when using $CO_2$ (dry ice) evaporating and venting the chamber as a gas displacing oxygen. It is yet an additional object of the present invention to provide a system wherein the pipe freezing apparatus can be installed by hand without tools. It is yet still further an object of the present invention to devise a system and method that is useful for all types of pipe including; PVC, copper and cast iron. It is still an object of the present invention to obviate a need for a specifically designed vent for the pipe freezing apparatus.

BRIEF SUMMARY OF THE INVENTION

The present invention specifically addresses and alleviates the above mentioned deficiencies associated with the prior art. More particularly, the present invention, in a first aspect is directed to a system for providing upkeep and maintenance to a piping system comprising: a pipe freezing apparatus mountable around a pipe for use in freezing a plug of liquid within the pipe including: a first half pipe portion having a cylindrical outer wall; a semi-circular end plate fixedly welded to the first half pipe portion, the semi-circular end plate configured to fit around a predetermined pipe diameter; and a swivel injector configured to the first half pipe portion for attachment to a refrigerant supply hose, the swivel injector providing for the hose to rotate 360 degrees with respect to the first half pipe portion; and one or more tools for providing maintenance to the piping system.

The system for providing upkeep and maintenance to a piping system herein is additionally characterized wherein the one or more tools for providing maintenance to the piping system comprises a tee-handle wrench. Herein the tee-handle wrench includes: a tee-handle on a proximal end thereof; and a fork on a distal end configured to assist removal of a valve in the piping system.

The system in this aspect is further characterized as including an adjustable offset wrench that includes: a wrench arm configured at a 90 degree angle with respect to a wrench head; and a wrench handle rotatably threaded to the wrench arm wherein when a thread is tightened and secured, the wrench handle is maintained at a 90 degree angle with respect to the wrench arm and parallel to the wrench head.

Further the pipe freezing apparatus herein, it comprises a cylindrical outer wall having a thickness greater than a thickness of the end plate, thereby providing for the end plate to more easily adjust and slide along the pipe having portions that bend.

The invention in this aspect is additionally characterized wherein the swivel injector further comprises: threads at a first end; a circular rotatable head at a second end opposite the first end, the circular head having a diameter greater than a diameter of a hole in the cylindrical outer wall; and a convergent divergent nozzle for delivering compressed refrigerant to atmospheric pressure in the pipe freezing apparatus.

The pipe freezing apparatus herein may be further characterized as comprising a closure mechanism, the closure mechanism further including: a hook configured on the first cylindrical half pipe portion; a lever rotating about a pin configured to a second half pipe portion; and a rigid loop arm rotatably configured to the lever, further able to connect to the hook to be tightened and secured by the lever.

The system herein further includes a 90 degree elbow connecter coupled to the swivel injector to facilitate working vertically wherein piping is subterranean. Also, the pipe freezing apparatus has a plurality of tolerances between the semi-circular end plate and the pipe and further between the injector circular rotatable head and the cylindrical outer wall, the tolerances selectively chosen to vent $CO_2$ gas naturally evaporating from dry ice within the pipe freezing apparatus.

Lastly the pipe freezing apparatus (canister) is further characterized wherein the first and second half pipe portions both have edges that mate directly together during use.

These, as well as other advantages of the present invention will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1A:
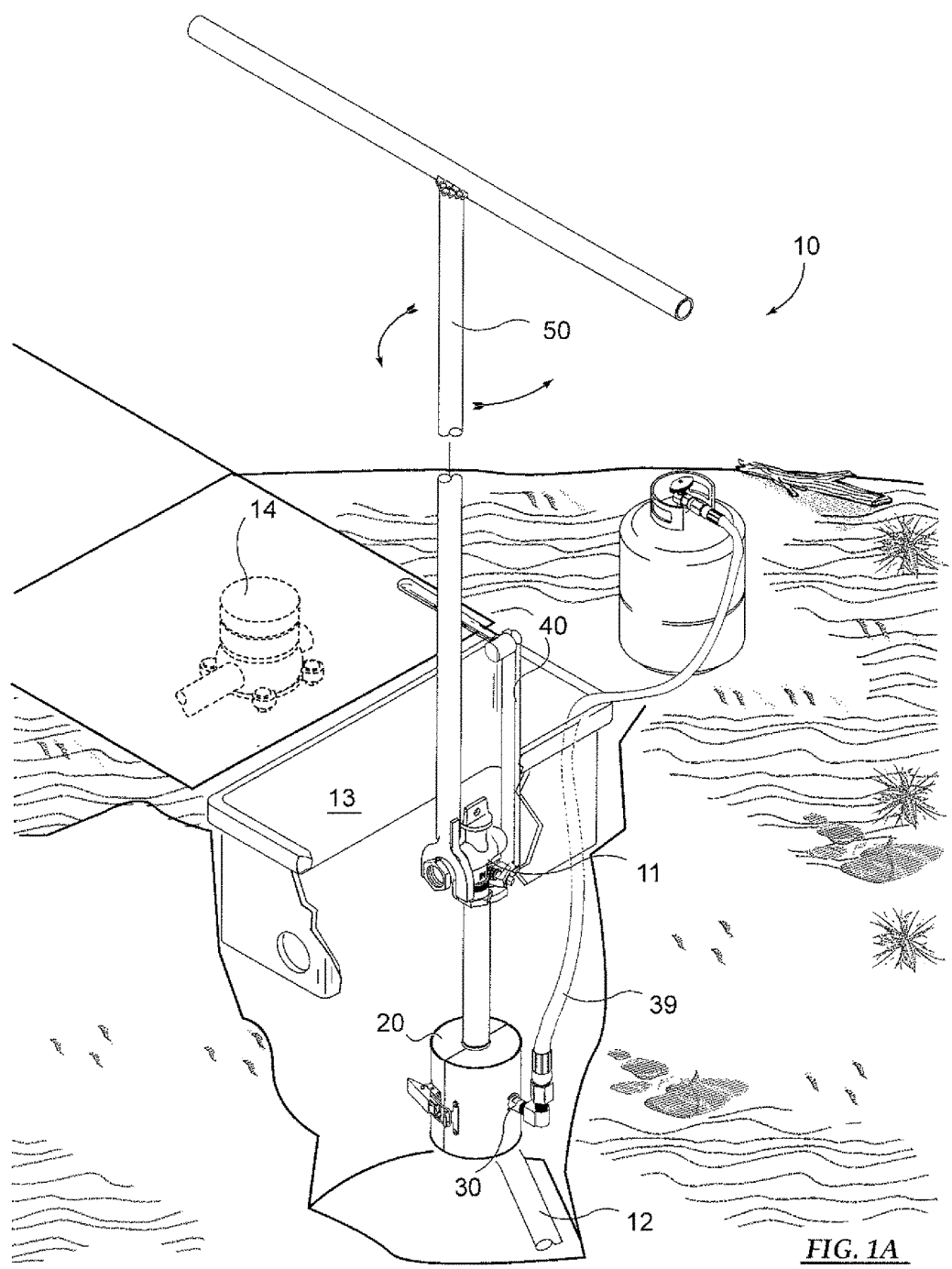
FIG. 1A is a perspective illustration of a first preferred piping system maintenance of the present invention and method associated with same.

With reference to FIG. 1A, a first preferred system and method 10 of the present invention is illustrated. Herein, a novel set of tools 20, 40, 50 and a method of performing this process that is much simpler and faster to complete as further detailed herein.

Figure 1B:
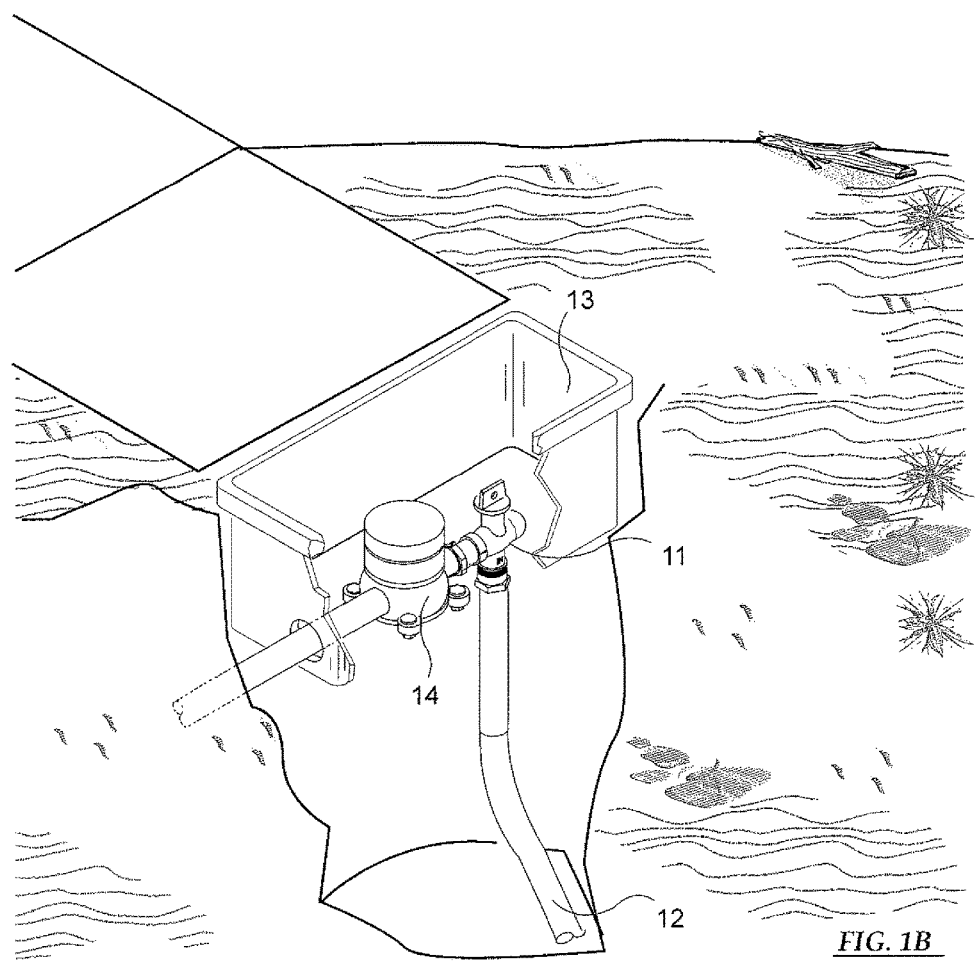
FIG. 1B is illustrative of a pipe system having a valve and valve meter dug out and thus prepared for work.

Initially as illustrated in FIG. 1B an exemplary water supply line 12 provides water to the angle meter stop valve 11, the outlet of which is coupled to the water meter 14 in a water meter box 13. The figure (FIG. 1B) illustrates an area where the water supply line 12 that has been dug out (with a post hole digger, for example) at a bottom of the meter box 13. Traditionally with conventional system and tools, the entire meter box 13 would have to be removed possibly having concrete around it.

Figure 1C:
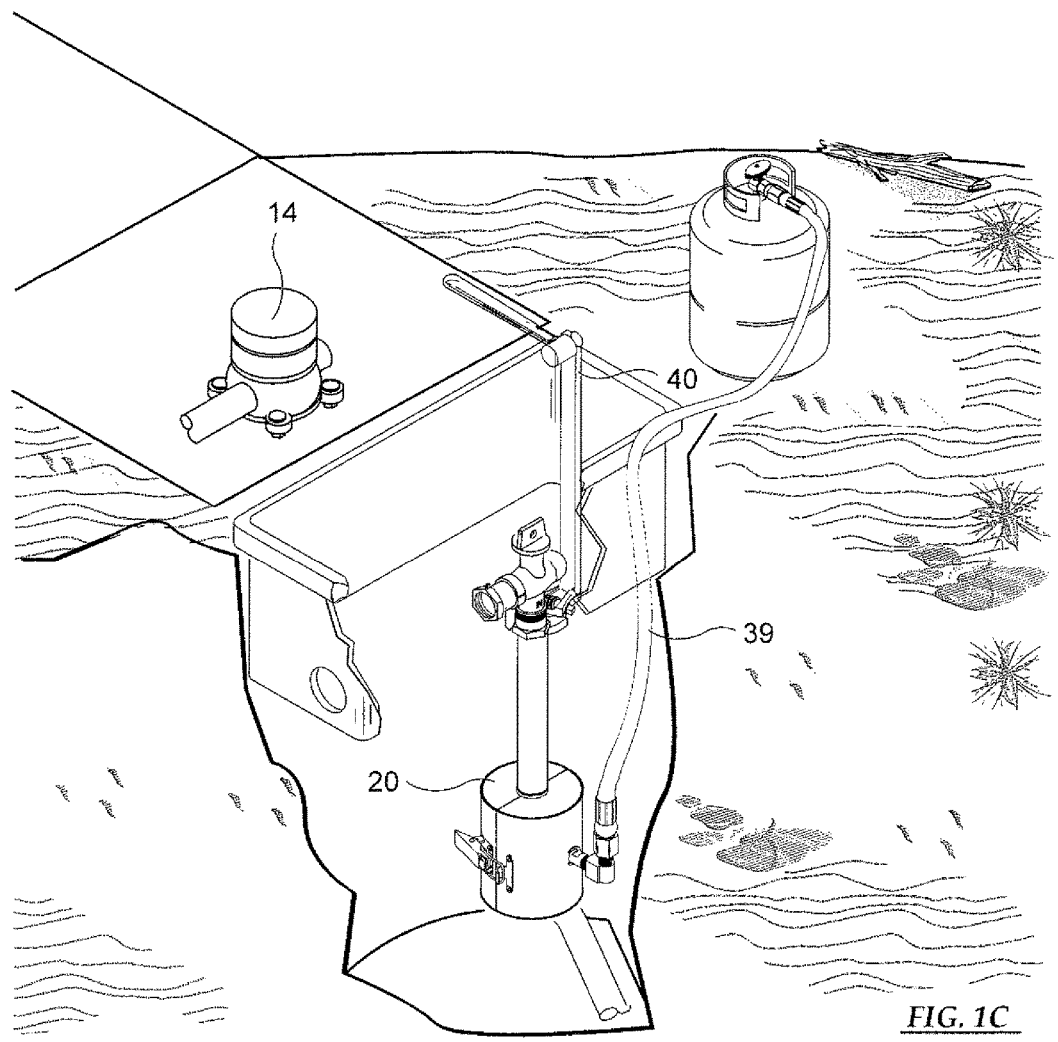
FIG. 1C illustrates a method step where a pipe freezing apparatus is attached to a pipe and further wherein a water meter is removed.
Figure 1D:
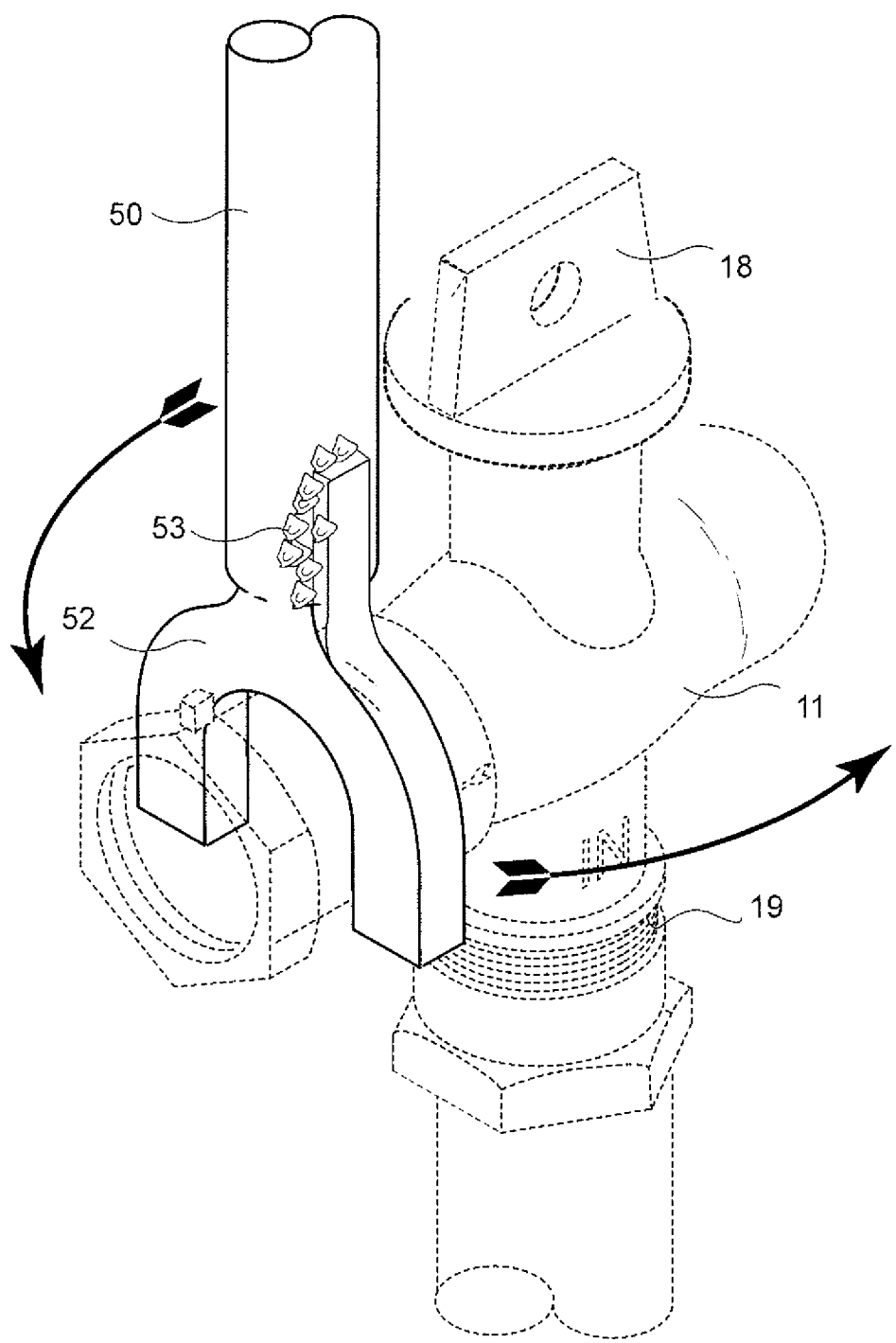
FIG. 1D is an enlarged view of an angle meter stop valve to be replaced and a wrench of the present invention therewith.
Figure 1E:
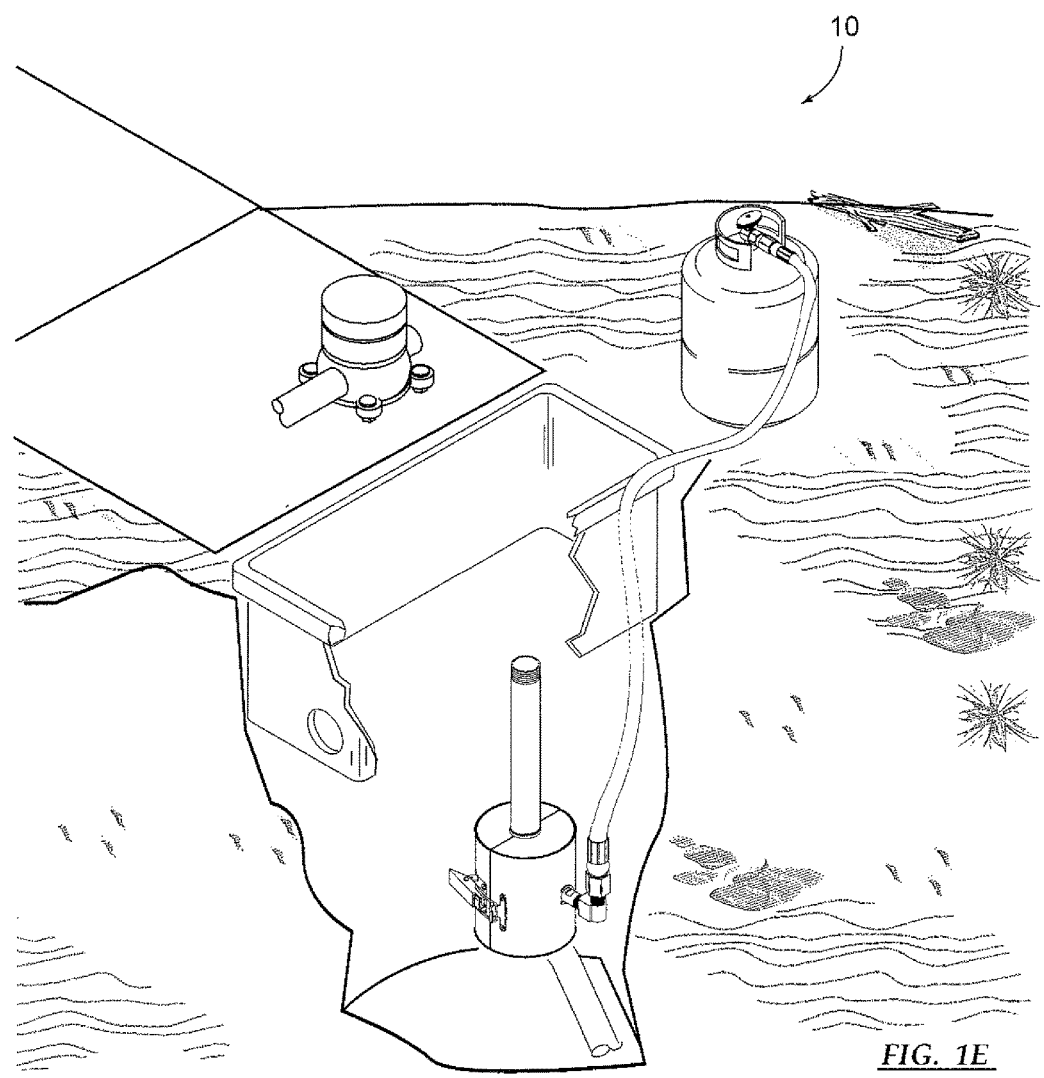
FIG. 1E shows the method step of the angle stop valve removal.

FIG. 1C illustrates the meter 14 removed following application of a pipe freezing apparatus 20 as further detailed herein. Prior to removing the angle meter stop 11, a pipe freezing device 20 is attached to the supply pipe 12 below the angle meter stop valve 11. In removing the angle meter stop valve 14 without digging out a large amount of soil for conventional tool access, an adjustable offset angle wrench 40 is provided a first improved tool, as further detailed herein and by FIG. 4. Again, FIG. 1A shows a second specially designed tee handle fork wrench 50 assisting valve 11 removal as further described in relation to FIG. 5. Still further, FIG. 1D provides an enlarged view thereof showing threads 19 for valve removal and valve stein 18 for valve 11 operation. FIG. 1E illustrates the removal complete. It should be further noted that canister 30 can be installed by hand without tools and can be removed while still frozen without damage.

Figure 2A:
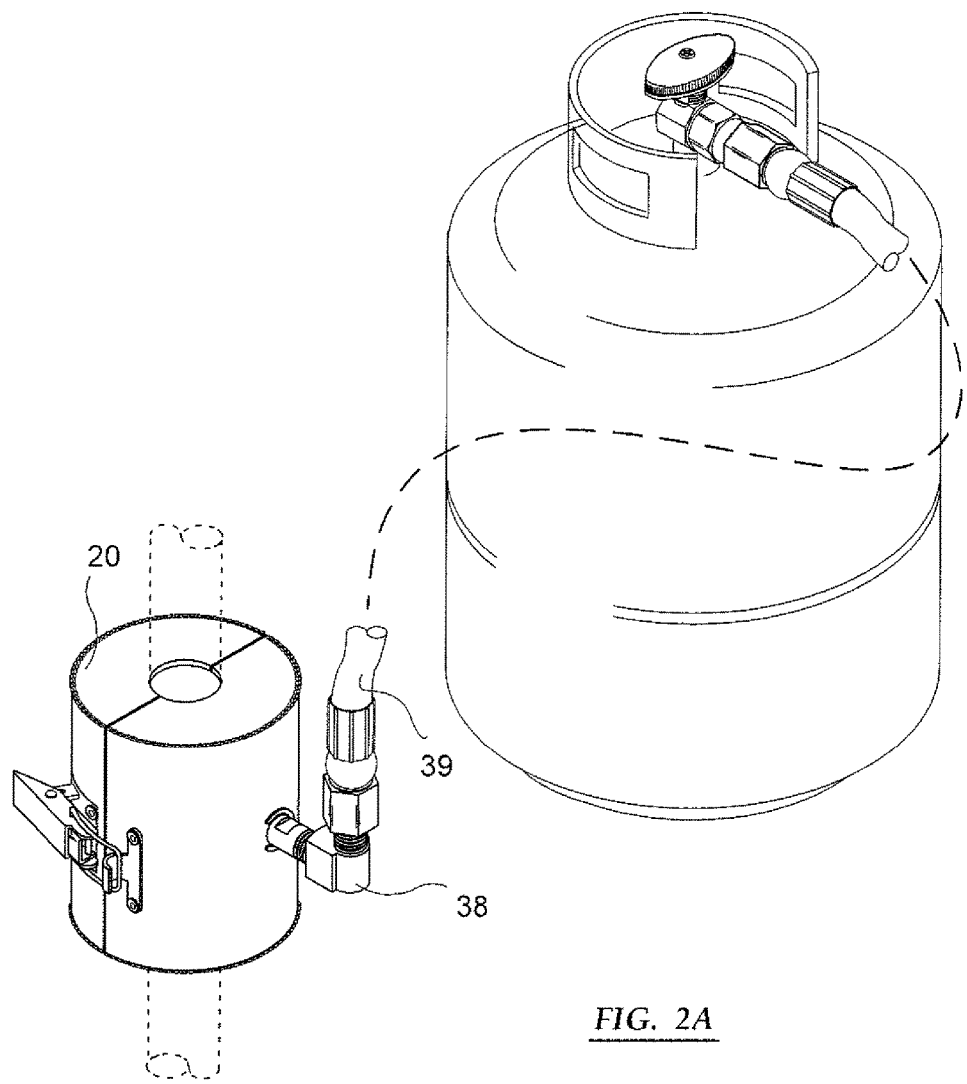
FIG. 2A is an enlarged view of a pipe freezing apparatus of the present invention in addition to a bottle of compressed refrigerant.
Figure 2B:
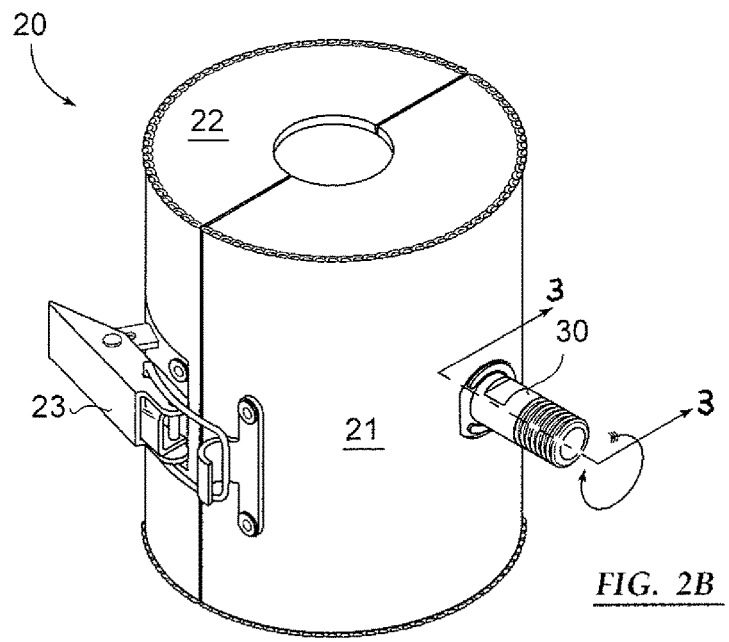
FIG. 2B is an additional perspective view of the pipe freezing apparatus according to a preferred embodiment of the present invention.
Figure 3:
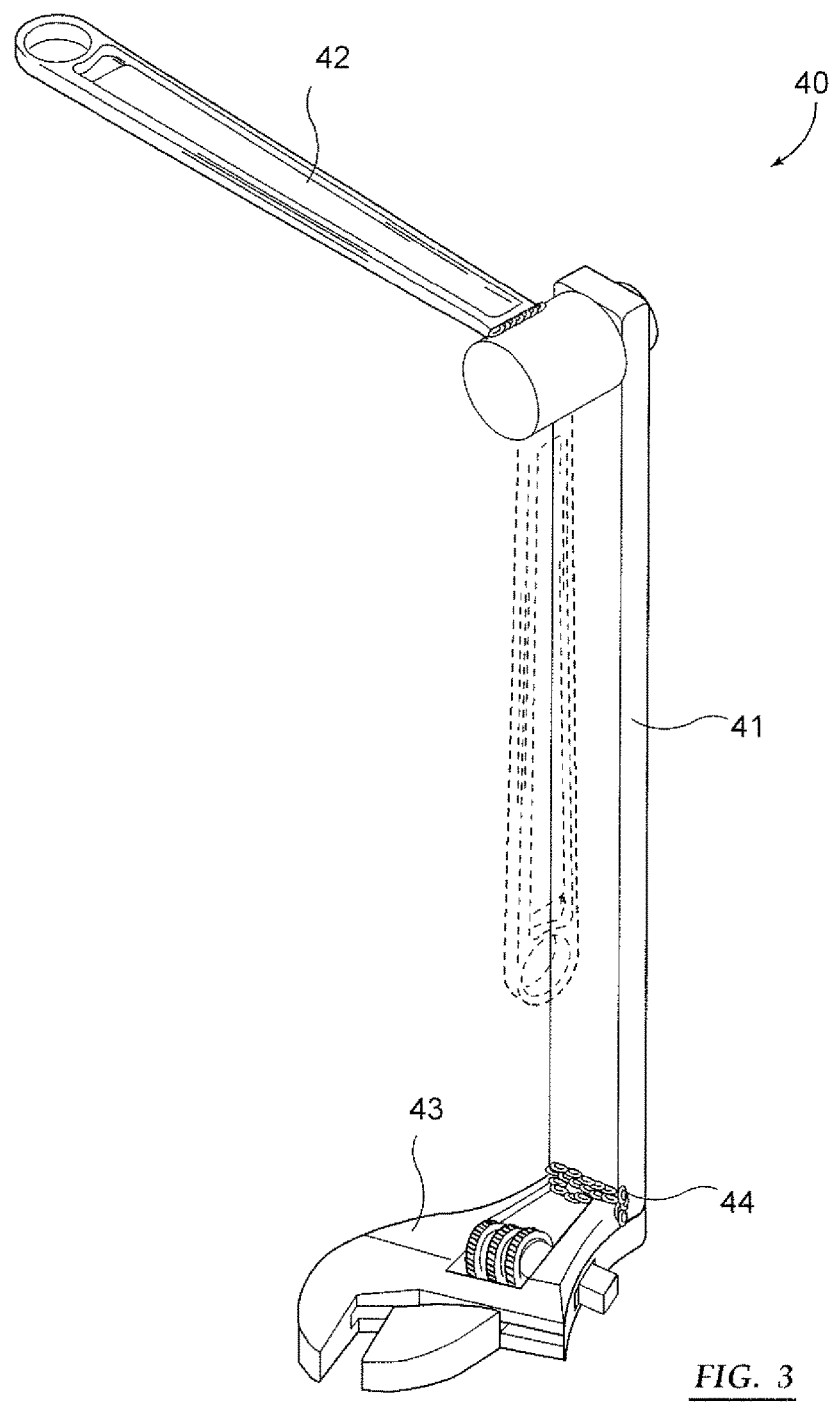
FIG. 3 is a perspective view of an adjustable offset wrench of the preferred pipe maintenance system of the present invention.

FIG. 2A illustrates an enlarged view of a pipe freezing apparatus 20 of the present invention 10 in addition to a bottle of compressed refrigerant ($CO_2$) having a supply line 39. As shown together with FIG. 2B, an elbow connector 38 is provided to connect to swivel injector 30 (FIG. 2B and FIG. 3). Importantly, the elbow 38 allows for a narrower hole requiring less soil removal. Also, since swivel injector 30 is rotatable, the elbow connector 38 can be attached by hand without tools, although hose 39 and elbow are fixedly attached. Still additionally, the elbow 38 and pipe freezing canister 20 can rotate freely about one another (FIG. 3) from the position of the hose 39; and can easily be installed at any angle, vertically or horizontally.

Figure 2C:
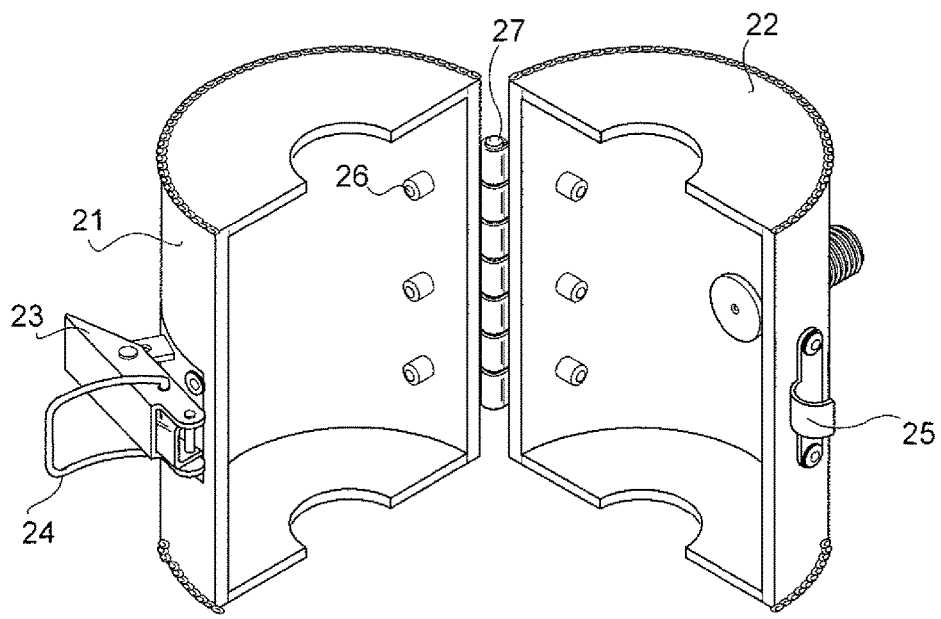
FIG. 2C is yet an additional perspective view of the pipe freezing apparatus according to a preferred embodiment of the present invention in an opened state to reveal an interior thereof.

FIG. 2C is yet an additional perspective view of the pipe freezing apparatus 20 according to a preferred embodiment 10 of the present invention in an opened state to reveal an interior thereof. The first preferred pipe freezing apparatus generally comprises: first and second half pipe portions 21 having a cylindrical outer wall; a pair of semi-circular end plates 22 fixedly welded to the half pipe portions 21, the semi-circular end plates 22 configured to fit around a predetermined pipe 12 diameter; and a swivel injector 30 configured to the first half pipe portion 21 for attachment to a refrigerant supply hose 39, the swivel injector providing for the hose to rotate 360 degrees with respect to the first half pipe portion 21 (and the pipe freezing apparatus 30).

With close inspection of FIG. 2C, end plate 22 wall is thinner than cylindrical wall 21. This provides the apparatus 20 with more play and flexibility to move around on a pipe 12 that is not perfectly straight (see e.g. FIG. 1A). In practice, underground lengths of pipe 12 are almost never perfectly straight do to being comprised of soft copper or bendable PVC that may be packaged in rolls. This together with the tolerances designed between end plates 22 and pipe allow for work to be performed in a somewhat dirty environment saving man-hours. In a preferred embodiment, cylindrical wall 21 comprises ¹¹⁄₁₆" thick aluminum alloy and end plate 22 is ³⁄₁₆" thick.

Further regarding FIG. 2C, the edges of cylindrical walls mate together without gaskets allowing for the removal of canister 20 while it is still frozen. In fact, dry ice within the canister can be reused. The lack of gaskets, strings, rubber hoses, or bolts for fastening provide for a simpler design that will not require thawing before removal that would otherwise damage the device 20. Multiple rivets 26 are provided to attach hinges 27 and closure mechanism 23, 24, 25 are provided as further described herein.

Figure 2D:
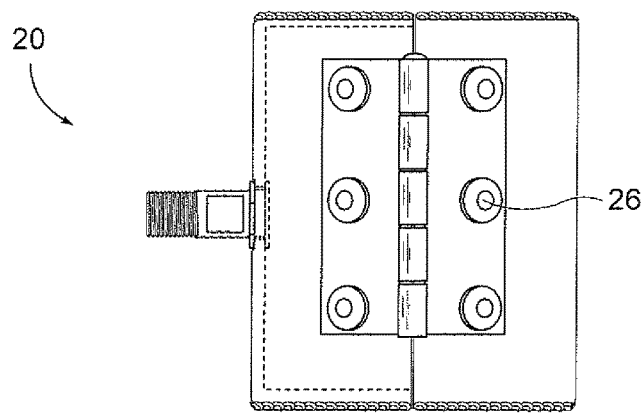
FIG. 2D is a first profile view of the pipe freezing apparatus.
Figure 2E:
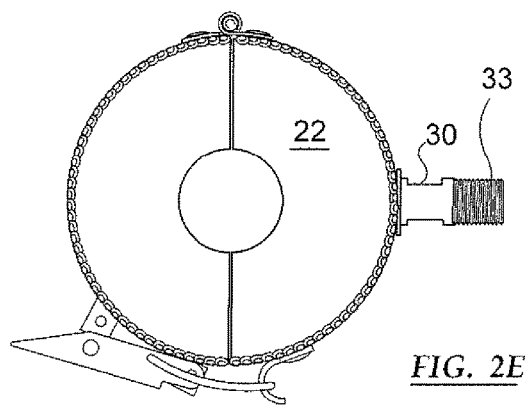
FIG. 2E is a top view thereof.
Figure 2F:
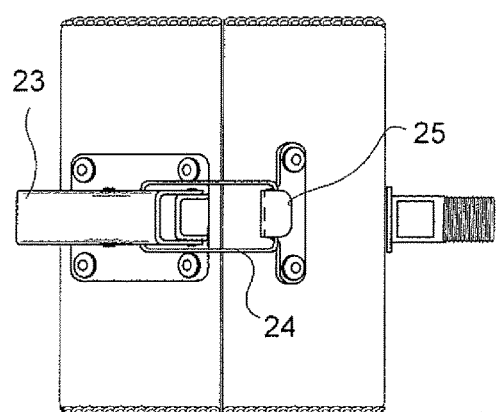
FIG. 2F is a second profile view of the pipe freezing apparatus from an opposite vantage point as the first.

FIG. 2D is a first profile view of the pipe freezing apparatus 20 and again illustrates attachment rivets 27. FIG. 2E illustrates a top view thereof. With regard to FIG. 2F, a second profile view of the pipe freezing apparatus from an opposite vantage point as the first is illustrated. Together with FIG. 2C a closure mechanism 23, 24, 25 is shown that can be secured by hand without extra tools that would need to reach deep underground. Also the pipe freezing device 20 has no removable parts for ease of application. The closure mechanism comprises: a hook 25 configured on the first cylindrical half pipe portion 21; a lever 23 rotating about a pin configured to a second half pipe portion 21; and a rigid loop arm rotatably (next to said pin and further away from the hook 25 with respect to said pin) configured to the lever 23 and able to connect to the hook to be tightened and secured by the lever.

Figures 2G, 2H:
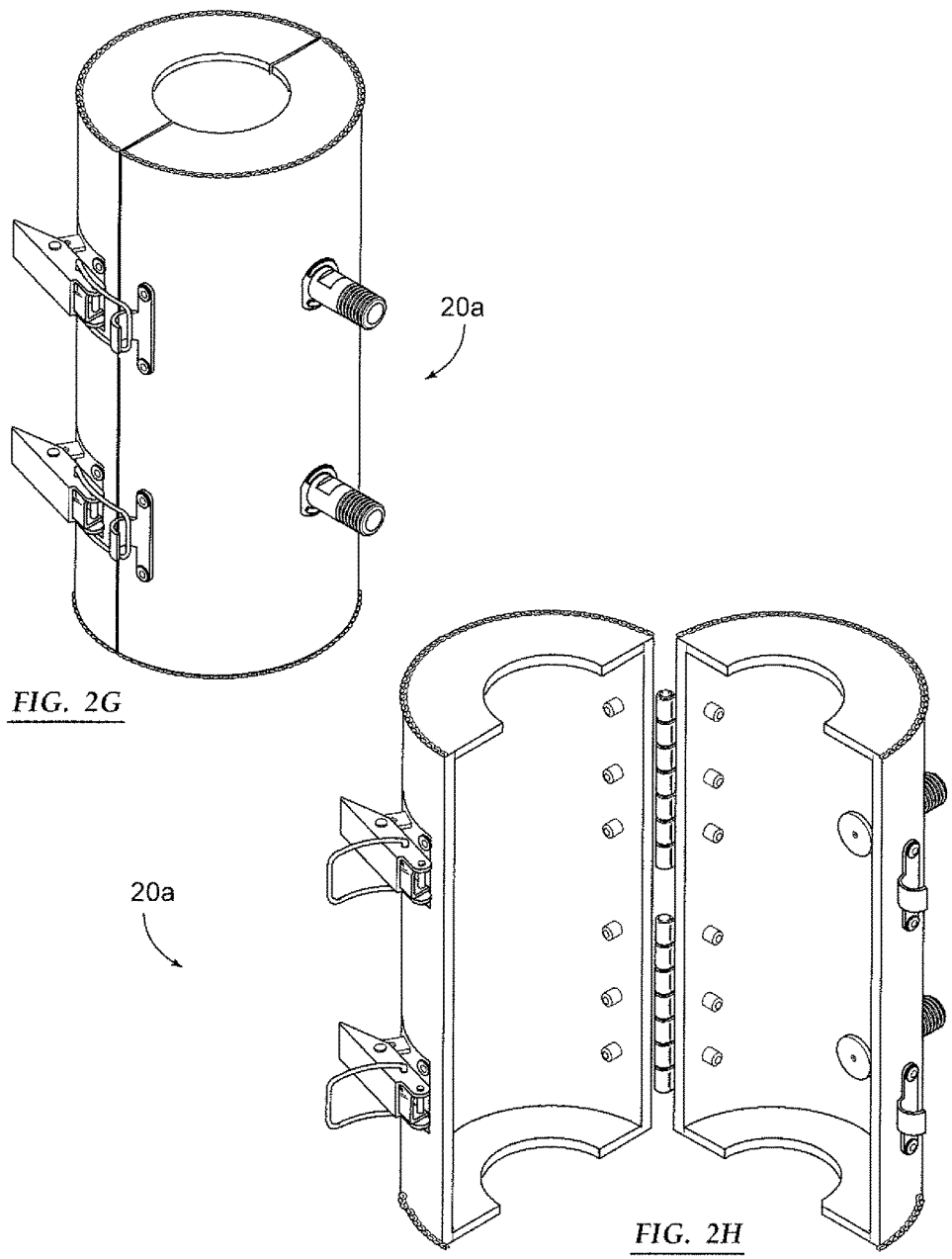
FIG. 2G is a perspective view of a second preferred pipe freezing apparatus according to a preferred embodiment of the present invention.
FIG. 2H is still an additional perspective view of the second preferred pipe freezing apparatus in an opened state to reveal an interior thereof.

FIG. 2G and FIG. 2H illustrate a perspective view of a second 20a preferred pipe freezing apparatus according to another preferred embodiment of the present invention. As shown, the example is able to accommodate a thicker pipe 12.

Figure 4:
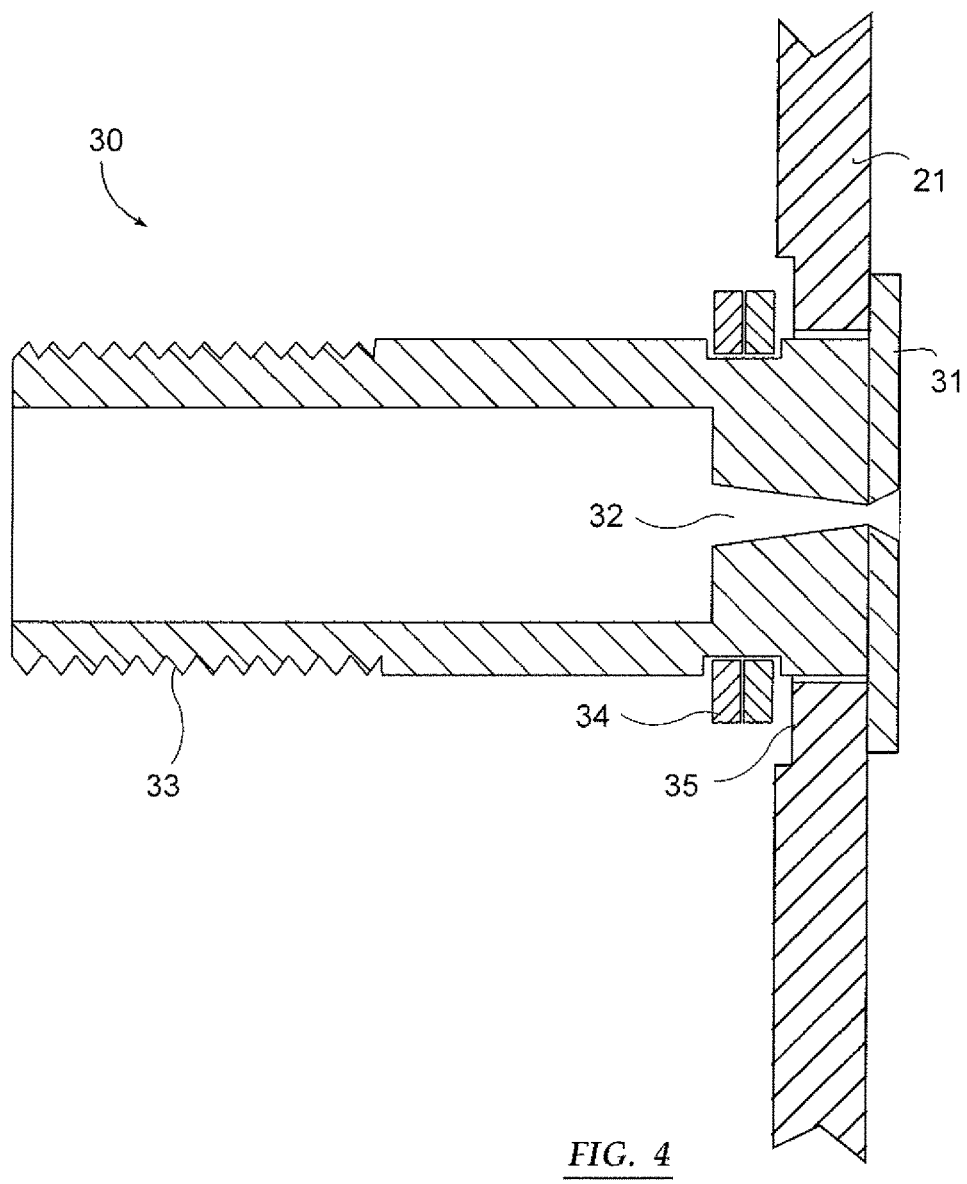
FIG. 4 is a cross sectional view of a swivel injector taken along line 3-3 in FIG. 2B.

With regard to FIG. 4, a cross sectional view of a swivel injector taken along line 3-3 in FIG. 2B is illustrated. Generally swivel injector 30 comprises threads 33 at a first end, a circular rotatable head 31 at a second end opposite the first end, the circular head 31 having a diameter greater than a diameter of a hole in the cylindrical outer wall, and a convergent divergent nozzle 32 for delivering compressed refrigerant to atmospheric pressure in the pipe freezing apparatus 20. Also with reference to FIG. 4, a flat portion 35 of the cylindrical wall 21 is machined out so that clasp 34 can rest flatly on the side wall 21. Once attached, the movement of the hose 39 (FIG. 2A) combined with the rotating canister 20 create a swiveling effect.

With regard to FIG. 3, a closer view of an adjustable offset wrench 40 is illustrated. The wrench 40 comprises an adjustable (e.g. adjustable wrench type) head 43 that is welded at an approximately right angle to a shaft 41. A handle 24, which may be attached with a thread, is provided at the other end of the wrench 40. A fixed size head 43 may also be used, but this provides less flexibility for different size fittings at the base of the angle meter stop valve 11. To make the offset angle wrench 40 the handle of a normal wrench may be cut off the wrench and a piece of steel shaft 41 (extension) can be welded at a right angle to the remaining wrench head 43. The handle 42 may then be attached with a thread at the other end of the metal extension shaft 41. This design 40 allows the user to kneel and use the wrench below the surface of the ground. The wrench 40 is used to hold the retaining nut in place while the forked wrench 50 is turning the angle meter stop valve 11. The offset wrench 40 also is designed to be compact when not in use and ridged when in use (i.e. thread tightened to a right angle).

Figure 5:
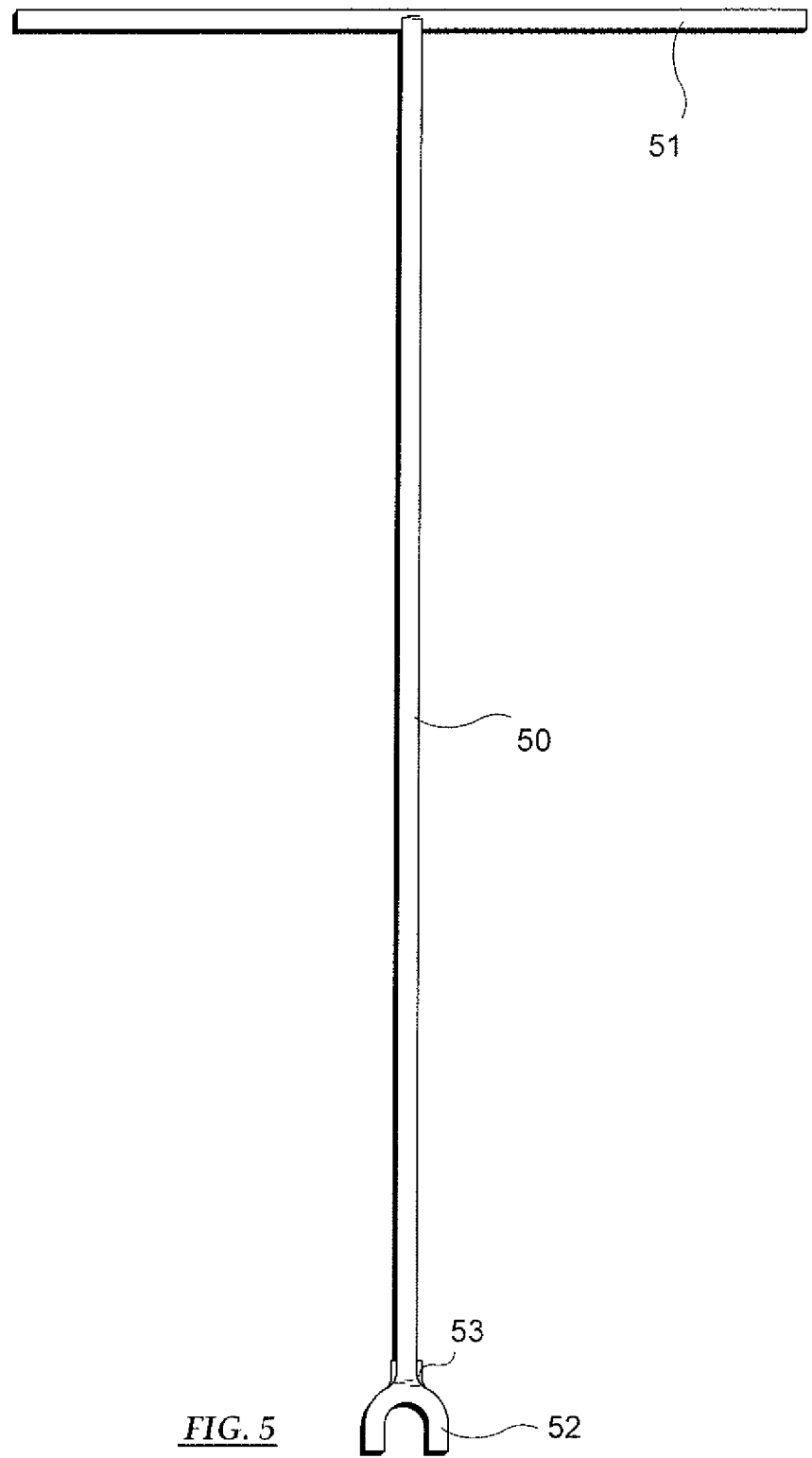
FIG. 5 is a front plan view of a tee-handle fork wrench of the present invention.

Regarding FIG. 5 (together with FIG. 1D), a tee handle 51 fork wrench 50 is illustrated. The tee handle fork wrench 50 has a forked lower end 52 (welded 53 thereto) that fits around a horizontally extending neck of the angle meter stop valve 11. This wrench 50 is thus designed to work by being installed over the throat of the angle meter stop valve 11 behind the meter nut and before the body of the valve 11. The tee handle forked wrench 50 works by binding the throat of the valve between the jaws 52 of the wrench allowing torque to be applied. Next, torque is applied to the valve 11 from a vertical angle. This allows the operator of the wrench 50 to be in a standing position and easily turn the wrench.

The tee handle 51 may be made from metal pipe and the forked attachment may be made of alloy, and is welded 53 to the tee handle.

In a preferred method of the invention, the offset angle wrench 40 is used to fix a retaining nut on the supply pipe, and the tee handle fork wrench 50 is rotated to unscrew (via threads 19) the angle meter stop 11 from the supply line 12. Because both the offset wrench 40 and the fork wrench 50 extend vertically upward from the angle meter stop 11, very little soil requires removal to provide the needed access to the angle meter stop and the workers can perform the needed removal while remaining above ground. Additionally, wrenches 40, 50 are useful to remove old, broken, or damaged valve 11 parts and further assist in installation of a new valve.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular System and Method for Providing Upkeep and Maintenance to Piping Systems as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for providing upkeep and maintenance to a piping system including a pipe comprising:
    a pipe freezing apparatus mountable around the pipe to freeze a plug of liquid within the pipe including:
        a first half pipe portion having a cylindrical outer wall;
        a semi-circular end plate fixedly welded to the first half pipe portion, the semi-circular end plate configured to fit around a predetermined pipe diameter; and
        a swivel injector permanently affixed to the first half pipe portion having the cylindrical outer wall and protruding outwardly from the cylindrical outer wall, cylindrical shape for attachment to a refrigerant supply hose, the swivel injector further configured to rotate 360 degrees with respect to the first half pipe portion; and the swivel injector further comprising:
        a circular rotatable head at a second end opposite a first end, the circular rotatable head having a diameter greater than a diameter of a hole in the cylindrical outer wall;
        a convergent divergent nozzle extending through the hole for delivering compressed refrigerant to atmospheric pressure in the pipe freezing apparatus; and
        wherein the circular rotatable head at the second end opposite the first end is situated on an inside surface of the cylindrical outer wall relative to the pipe freezing apparatus, the cylindrical outer wall having a recessed flat portion carved out of an outside surface of the cylindrical outer wall opposite the inside surface, and further comprising a circular clasp configured around and contacting the recessed flat portion, the circular clasp being slidable within the recessed flat portion, which creates a swiveling effect, wherein the hole in the cylindrical outer wall connects said inside surface with said outside surface; and
    further the system comprising one or more tools for providing maintenance to the piping system, the one or more tools for performing one or more of a plurality of functions, the one or more of the plurality of functions including removing a valve.

2. The system for providing upkeep and maintenance to a piping system of claim 1, the one or more tools for providing maintenance to the piping system comprising tee-handle wrench, the tee-handle wrench including:
    a tee-handle on a proximal end thereof; and
    a fork on a distal end configured to assist removal of the valve in the piping system.

3. The system for providing upkeep and maintenance to a piping system of claim 1, the one or more tools for providing maintenance to the piping system comprising an adjustable offset wrench, the adjustable offset wrench including:
    a wrench shaft affixed at a 90 degree angle with respect to a wrench head;
    a wrench handle rotatably threaded to the wrench shaft wherein when in operation, the wrench handle is maintained at a 90 degree angle with respect to the wrench shaft and parallel to the wrench head.

4. The system for providing upkeep and maintenance to a piping system of claim 1, wherein the cylindrical outer wall has a thickness greater than a thickness of the end plate, thereby allowing the end plate to be easily adjustable and slidable along the pipe having portions that bend.

5. The system for providing upkeep and maintenance to a piping system of claim 1, the swivel injector further comprising threads at a first end.

6. The system for providing upkeep and maintenance to a piping system of claim 1, the pipe freezing apparatus further comprising a closure mechanism, the closure mechanism further comprising:
    a hook affixed to the first half pipe portion;
    a lever rotating about a pin configured to a second half pipe portion; and
    a rigid loop arm rotatably configured to the lever, further able to connect to the hook to be tightened and secured by the lever.

7. The system for providing upkeep and maintenance to a piping system of claim 1 further comprising a 90 degree elbow connecter coupled to the swivel injector to facilitate working vertically wherein piping is subterranean.

8. The system for providing upkeep and maintenance to a piping system of claim 1 further comprising a second half pipe portion, wherein the first and second half pipe portions both have edges that mate together when attached to the pipe.

9. A pipe freezing apparatus mountable around a pipe to freeze a plug of liquid within the pipe, the pipe freezing apparatus including:

a first half pipe portion having a cylindrical outer wall;
a semi-circular end plate fixedly welded to the first half pipe portion, the semi-circular end plate configured to fit around a predetermined pipe diameter; and
a swivel injector permanently affixed to the first half pipe portion having the cylindrical outer wall and protruding outwardly from the cylindrical outer wall, and having a cylindrical shape for attachment to a refrigerant supply hose, the swivel injector further configured to rotate 360 degrees with respect to the first half pipe portion; and the swivel injector further comprising:
a circular rotatable head at a second end opposite a first end, the circular rotatable head having a diameter greater than a diameter of a hole in the cylindrical outer wall;
a convergent divergent nozzle extending through the hole for delivering compressed refrigerant to atmospheric pressure in the pipe freezing apparatus; and
wherein the circular rotatable head at the second end opposite the first end is situated on an inside surface of the cylindrical cuter wall relative to the pipe freezing apparatus, the cylindrical outer wall having a recessed flat portion carved out of an outside surface of the cylindrical outer wall opposite the inside surface, and further comprising a circular clasp configured around and contacting the recessed flat portion, the circular clasp being slidable within the recessed flat portion, which creates a swiveling effect, wherein the hole in the cylindrical outer wall connects said inside surface with said outside surface, and wherein the first end comprises threads for coupling to a refrigent supply hose.

* * * * *